Aug. 17, 1971  R. A. CLARK  3,600,254
APPARATUS FOR AFFIXING STRIP STAMPS TO BOTTLE NECKS
Filed Sept. 6, 1967  9 Sheets-Sheet 3

FIG-3

INVENTOR
ROBERT A. CLARK
BY Mason, Fenwick & Lawrence
ATTORNEYS

Fig-4

INVENTOR
ROBERT A. CLARK
BY Mason, Fenwick & Lawrence
ATTORNEYS

Aug. 17, 1971  R. A. CLARK  3,600,254
APPARATUS FOR AFFIXING STRIP STAMPS TO BOTTLE NECKS
Filed Sept. 6, 1967  9 Sheets-Sheet 9

Fig-12

INVENTOR
ROBERT A. CLARK
BY
Mason, Fenwick & Lawrence
ATTORNEYS

United States Patent Office 3,600,254
Patented Aug. 17, 1971

3,600,254
APPARATUS FOR AFFIXING STRIP STAMPS
TO BOTTLE NECKS
Robert A. Clark, Owensboro, Ky., assignor to Glenmore
Distilleries Company, Owensboro, Ky.
Filed Sept. 6, 1967, Ser. No. 665,773
Int. Cl. B65c 3/14, 9/06, 9/36
U.S. Cl. 156—477     14 Claims

ABSTRACT OF THE DISCLOSURE

An attachment for a labeler machine to apply strip stamps to bottles which is mounted for operation over bottles in predetermined orientation exiting from the labeler machine, that includes a plurality of stamp applying heads mounted for travel in an orbital path to a stamp magazine to pick up stamps, a glue applying station where the stamps receive adhesive and along a stamp applying path where the heads travel in unison with oriented bottles. Each head has a plunger to press the center of a stamp against the top of a bottle, and yieldingly hold it there, while compressible jaws move downwardly and inwardly to stretch the stamp ends along the sides of a bottle neck, and press them against the neck sides, into the radius between the neck and shoulders, and firmly onto the bottle shoulders, the pressure movement of the jaws being controlled by contact of the jaws with the plunger.

BACKGROUND OF THE INVENTION

This invention relates to strip label applying machines, and more particularly to machines for applying strip stamps over the closure and necks of bottles containing alcoholic beverages.

Many years ago, bottles of alcoholic liquors had body labels supplied by automatic machines, but the strip stamp, which is required to be placed over the cap, or other closure, and down the neck of the bottle so as to be ruptured when the bottle is opened, had to be applied by hand. Subsequently, a foot operated strip stamp applier was developed which required a stamp to be manually placed in the machine head for application. Still later, automatic machinery was perfected for applying the strip stamp.

In all known automatic machines, however, proper orientation of the bottle is lost during travel of the bottle from the labeling machine, where the body label is applied, to the strip stamp applying machine. This means that reorientation is necessary before the strip stamp can be applied. Reorientation requires extra and expensive machinery, and an added area where bottles can impact and break.

Strip stamp machines now in use do not apply the proper downward pressure to actually press the stamp tightly against the sides of the bottle neck, and, in the case of flat bottles, along the tapering shoulder at the base of the neck. Neither do they exert the stretching pressure required to obtain tight adherence to the bottle neck and seating into the curve at the juncture of the neck and shoulder. This causes labels to pull free from adherence to the bottle.

SUMMARY OF THE INVENTION

The general object of the present invention is to provide a machine for applying strip stamps to bottles, which will maintain proper orientation of the bottles from the labeler to the stamp applying mechanism, and which has improved means for applying strip stamps to bottles.

A more specific object is the provision of such a machine with means to hold flat bottles against rotation about a vertical axis during travel from the labeler to the strip stamp applying mechanism.

Another object is to provide means for automatically re-spacing bottles, if required, prior to application of the strip stamp, and maintaining positive spacing and synchronous movement of bottles with the strip stamp applying mechanism.

A further object is the provision of a machine for applying strip stamps which incorporates a long area of bottle travel in synchronism with a strip stamp applying head to insure ample time for pressure application of the stamp to the bottle.

Yet another object of the invention is to provide means for pressing the central portion of a strip stamp onto the top of a bottle closure, then forcing the wings down along the bottle neck sides and onto the bottle shoulders.

A still further object is the provision of means to press and hold the mid-portion of a strip stamp against the top of a bottle closure, and then squeeze and hold the stamp wings against the neck and shoulder of the bottle.

It is also an object to provide means to stretch the end portions, or wings, of strip stamps downwardly along the necks of bottles, with a secondary action pressing downwardly on the stamp ends to adhere them to the bottle shoulders.

Other objects of the invention will become apparent from the following description of one practical embodiment thereof, when taken in conjunction with the drawings which accompany, and form part of, this specification.

DESCRIPTION OF THE PREFERRED EMBODIMENT

Figure 1:
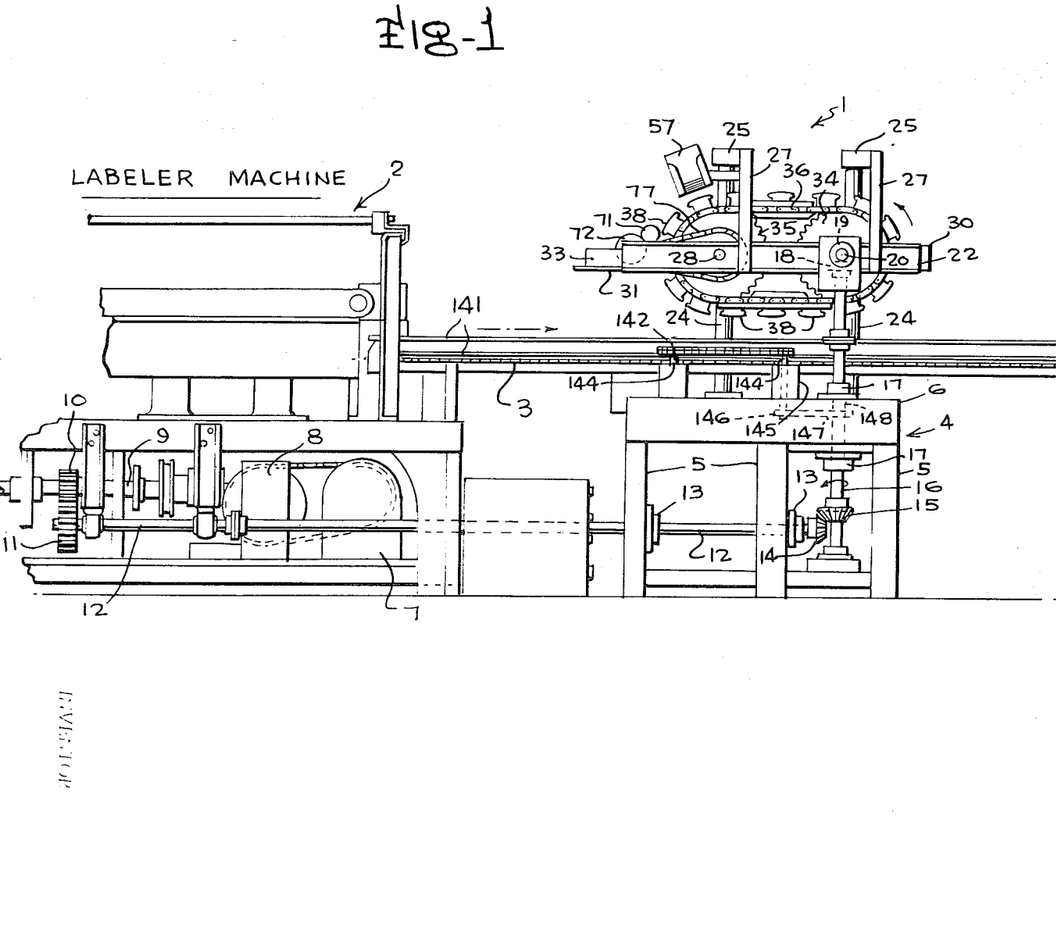
FIG. 1 is a side elevation of a portion of a labeler machine with the strip stamp applying machine of the present invention attached thereto.

Referring to the drawings in detail, and first to FIG. 1, the stamp applying mechanism 1 has been shown in conjunction with a labeler 2 which affixes the body labels on bottles. The stamp applying mechanism is a continuation of, and in a sense a part of, the labeler, as the bottle alignment obtained for the labeler is maintained by a guiding conveyor 3 for the stamp applying means and the drive of the labeler is used to power the stamp applier.

Referring to FIGS. 1 through 4, it will be seen that the guiding conveyor 3 is mounted upon the labeler machine and continues to, and through, the stamp applying mechanism, being mounted above a supporting frame 4 for the stamp applying apparatus. Frame 4 is a table type frame, having legs 5 and a top 6.

Motor 7 of the labeler drives a gear box 8, from which the drive shaft 9 of the labeler emerges. Power is taken from this shaft by means of a gear train 10, 11, with gear 11 being mounted upon a power take-off shaft 12. Shaft 12 is supported in bearings 13 on frame 4 and carries a bevel gear 14 on its end. This gear is in mesh with a bevel gear 15 on a vertical drive shaft 16, that extends upwardly to the stamp applying mechanism. Shaft 16 is suitably mounted in bearings 17 on the frame 4. At the upper end of shaft 16, there is a bevel gear 18 in mesh with a bevel gear 19 on a horizontal shaft 20. Shaft 20 is the powered shaft of the stamp applying mechanism.

Figure 2:
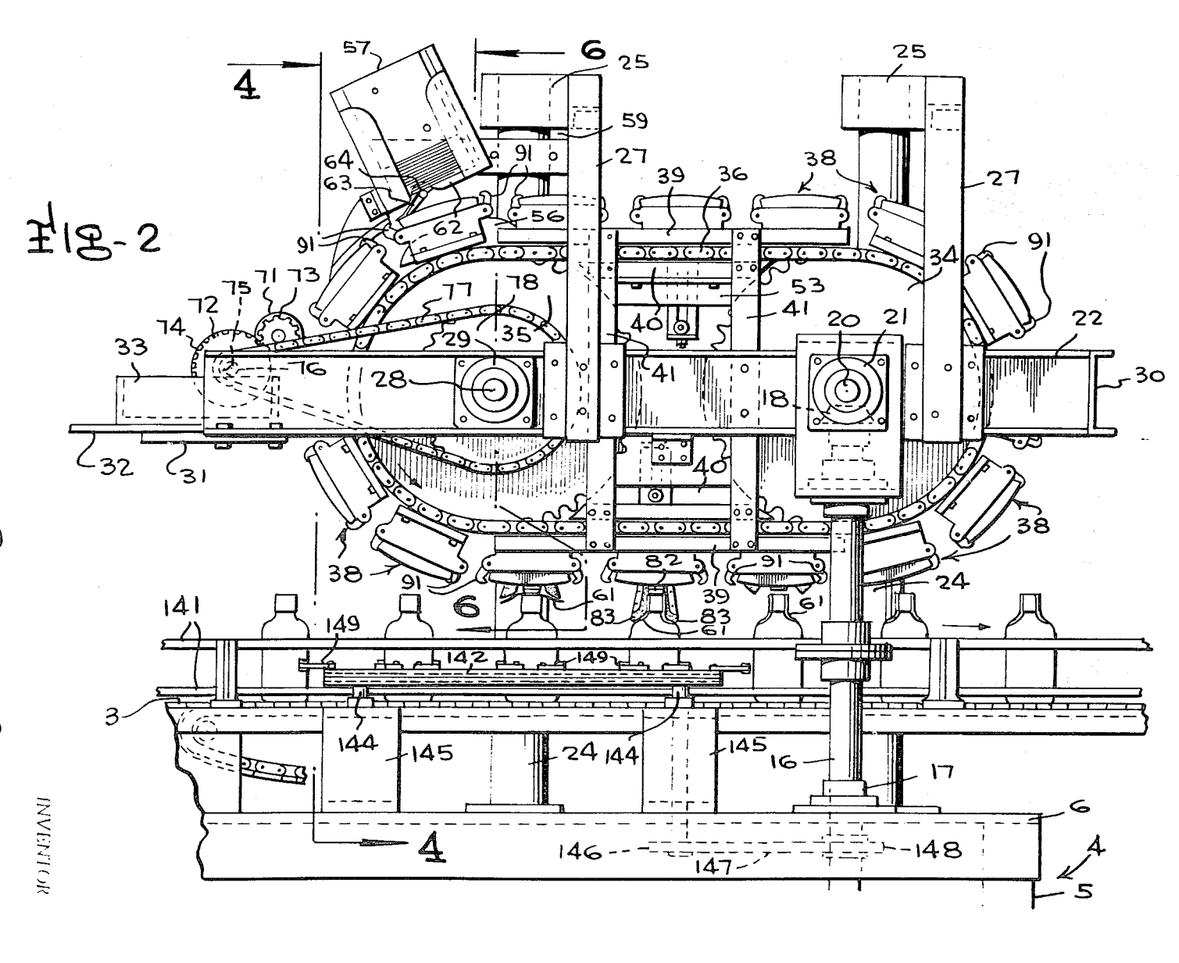
FIG. 2 is an enlarged side elevation of the bottle conveyor and the strip stamp applying head mechanism.
Figure 3:
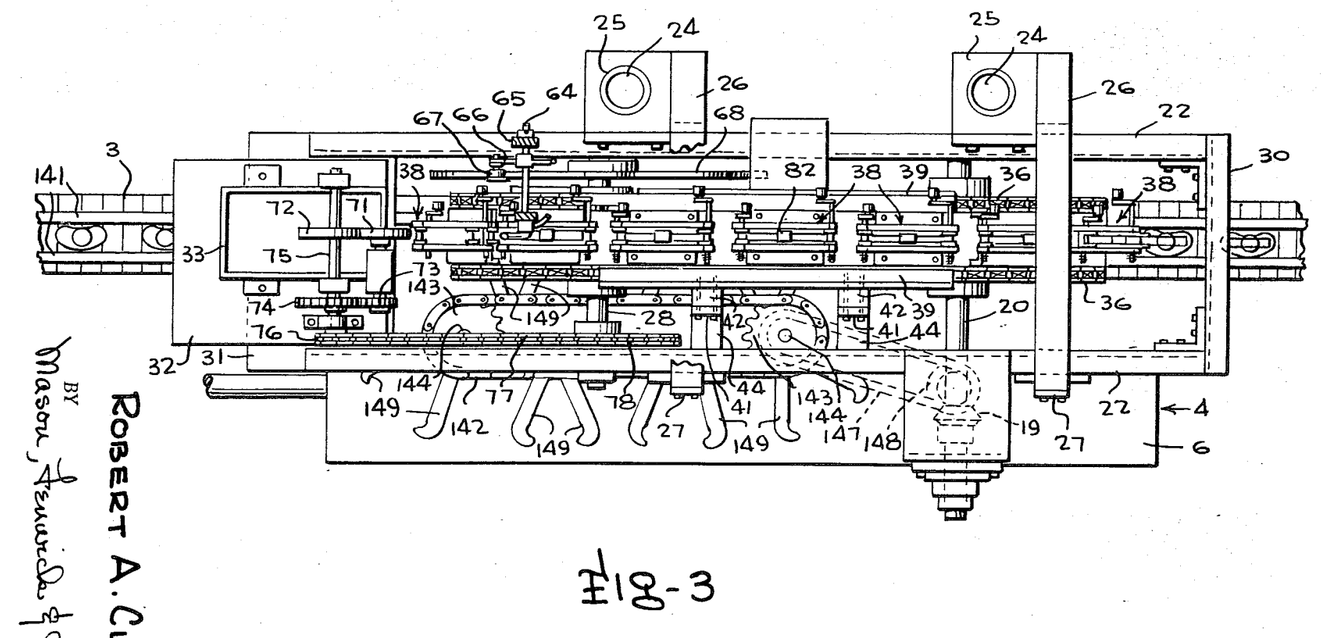
FIG. 3 is a top plan view of the structure shown in FIG. 2.
Figure 4:
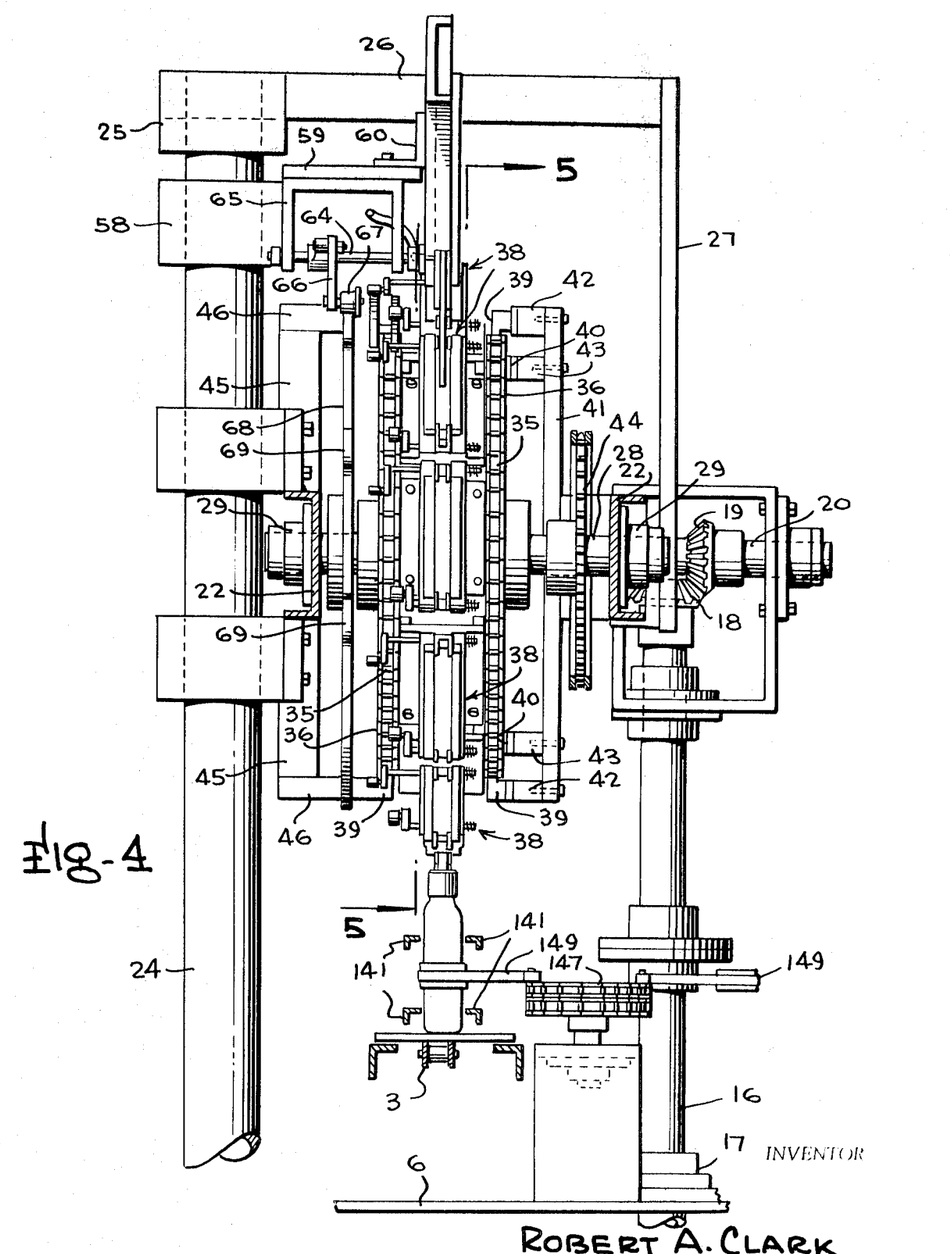
FIG. 4 is a vertical section taken on the line 4—4 of FIG. 2.

Shaft 20 has its main bearings 21 carried by spaced, parallel, horizontally extending channel beams 22. These beams form the main support for the stamp applying mechanism. The rear channel beam 22 is mounted upon vertically spaced blocks 23 fixed to supporting posts 24 carried by frame 4. Posts 24 have caps 25 from which frame arms 26 extend horizontally across the machine. Vertical legs 27 depend from the front ends of arms 26 and carry the front channel beam 22.

A second shaft 28 is also mounted in the beams 22, and it is spaced from, and parallel to, shaft 20, and has its ends mounted in bearings 29 carried by the beams 22. The beams are rigidified, and held in spaced relation, by means of a cross-channel 30 at the exit end of the apparatus, and by a plate 31 at the entrance end. Plate 31 provides a support for platform 32 on which a glue pot 33 is mounted.

Shaft 20 carries a pair of sprockets 34, mounted in spaced relation. Shaft 28 carries a similar pair of identically spaced sprockets 35. The sprockets 34 and 35 are aligned longitudinally of the channels 22 and the respective sprockets of the two shafts carry endless chains 36. Mounting brackets 37 are attached to the confronting sides of the chains 36 in equi-spaced relation around the full length of the chains. The brackets carry the stamp applying heads 38. The heads 38 are maintained in accurate horizontal paths along the top and bottom flights of the chains by means of chain guides 39 and 40, the chain guides 39 being on the outside of the orbital path of the chains and the guides 40 being on the inside. The guides at the front of the machine are supported by vertical strips 41, the strips being attached to the guides by blocks 42 and 43 and to the front guide beam 22 by blocks 44. At the rear, posts 45 are mounted directly on the rear beam 22 and mount blocks 46 which are connected to the channel guides.

Figure 5:
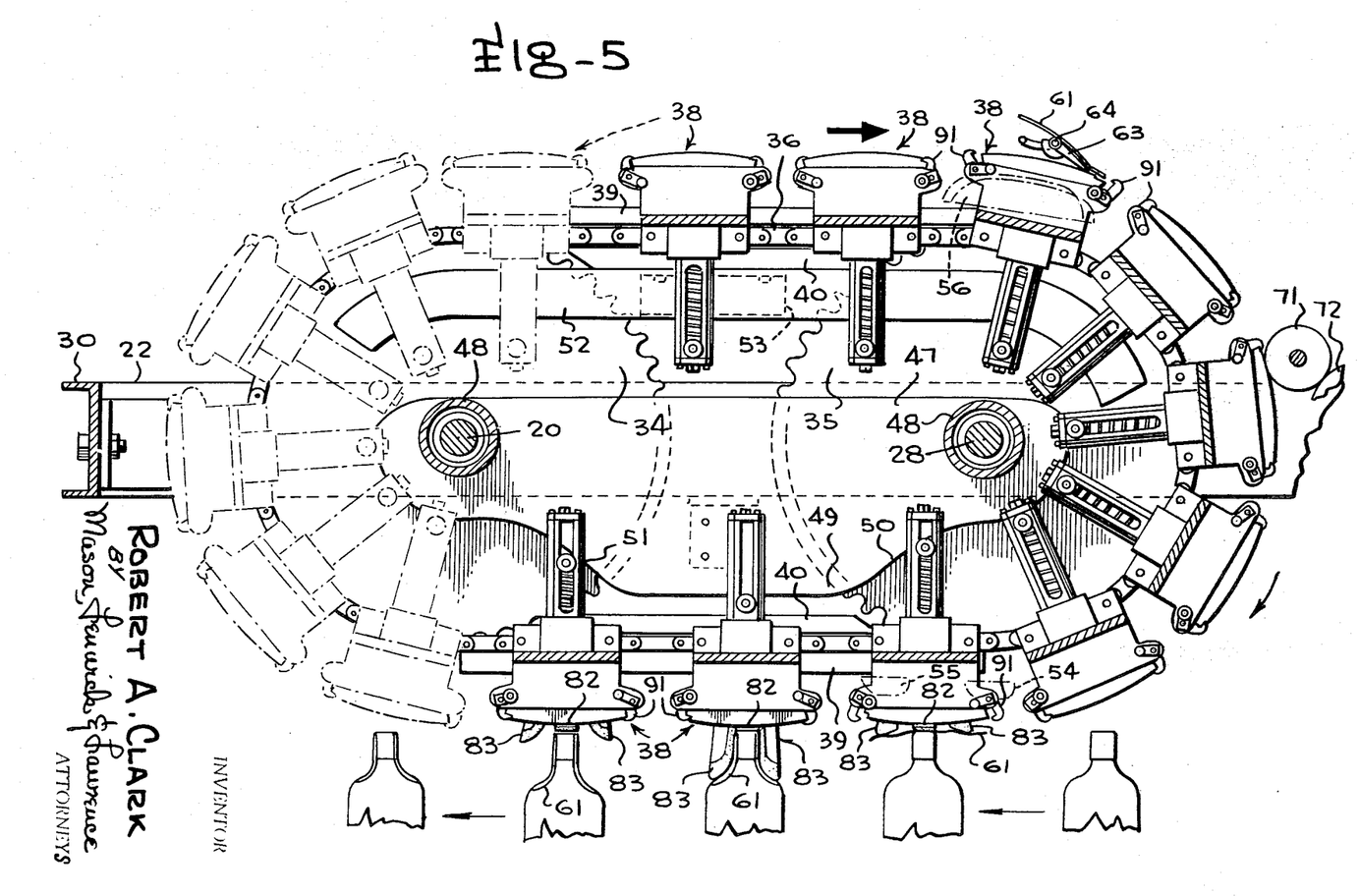
FIG. 5 is a vertical longitudinal section taken on the line 5—5 of FIG. 4.

Intermediate the chains, there are two horizontally spaced cams 47 mounted on sleeves 48, which are journaled on the shafts 20 and 28. The cams are approximately symmetrical about a vertical centerline midway between the shafts 20 and 28, and have a substantial rise 49 at the central bottom of the two cams. An advance incline 50 and an exit decline 51 bring the stamp applying heads 38 into and out of action, as will be described. A return cam 52 is mounted above the main cam 47 simply to return the heads 38 to inoperative position in the event their springs, to be described, have not returned them in a normal manner. These cams are fixed to the upper inside chain guides 40 by means of brackets 53. Two other small cams 54 and 55 are mounted on the outside chain guides 39 at the bottom on the end of the guides at the approach to the stamp affixing flight of the chains, as will be later described in detail. Still another cam 56 is located at the end of the return, inoperative flight of the applying heads 38, and this cam 56 is also fixed to the outside guide 39, but in this case to the upper outside guide.

Cam 56 is adjacent a labeling magazine 57 that is supported from one of the posts 24 by means of a block 58, a plate 59 and a bracket 60. The magazine is mounted to have its lower end at an angle above the chains, just as the heads begin to turn about the sprockets 34. The magazine may have any suitable construction, so long as there is a rectangular compartment to receive the strip stamps 61. The magazine has a partial shelf 62 at the bottom to support the upper portion of the bottom stamp of a stack, and the remainder of the bottom is open to allow for free movement of a stamp feeder 63. The stamp feeder, and in fact the entire magazine assembly, is of conventional construction. The feeder is a vacuum head and is pivotally mounted on a shaft 64 journaled in a bracket 65 depending from plate 59. The shaft is rocked to bring the vacuum head into contact with the end of the bottom stamp in the magazine and then reversed to draw the end of the bottom stamp downwardly for engagement by the jaw of a stamp applying head 38. The means for operating the feeder includes an arm 66 mounted on the shaft 64 and carrying a cam following roller 67. Arm 66 is actuated by means of a cam 68 mounted on shaft 28 for rotation with the shaft and the gear chain. The cam carries a plurality of rises 69 which are equally spaced around the periphery of the cam a distance equal to the center-to-center spacing of the stamp applying heads 38. As the cam rotates, roller 67 will strike the rises 69 and be lifted to rock shaft 64 and cause the vacuum head feeder 63 to be lifted into contact with the end of a stamp in the magazine. As the roller moves off of the rise, the stamp feeder will pull the stamp end away from the magazine into contact with the top of a stamp applying head at the position of the magazine. The downward movement of the feeder does not depend upon gravity alone, as a spring 70 is used to urge the feeder to its downward position. As the stamp end is drawn downwardly, it is gripped by one of the paws of the header, to be described, and as the header moves forward it will draw the stamp from the magazine. When the trailing end of the stamp is drawn down onto the header, a paw at the trailing end of the stamp applying head will grip it and hold it in place.

After a stamp has been placed on a head 38, it is carried by a glue applying roller 71, which is in surface contact with a feeder roller 72 that rotates within the glue in the glue pot 33. Gears 73 and 74 are mounted on the ends of the rollers 71 and 72, and the shaft 75 of roller 72 also carries a sprocket 76. Chain 77 passes around this sprocket and a sprocket 78 on shaft 28 so that when shaft 28 rotates, rollers 71 and 72 will rotate also.

Stamp applying heads 38 are shown most clearly in FIGS. 8 through 12. Each consists of a body 79 and a mounting column 80. Columns 80 movably support plunger and applicator jaw assemblies 81 with a plunger 82 and applicator jaws 83 being housed within a body 79 when inoperative.

The header body 79 is generally rectangular in cross-section, with a central chamber 84, which is wider at its middle, as at 85, to provide a free passageway for the plunger and the applicator jaw carrier 86. The body has horizontally extending flanges 87 at the top of its side walls, which carry the mounting brackets 37 for attachment of a head to the chains 36. End walls 88 of the body terminate about halfway down the body leaving the remaining section composed of spaced, parallel side walls 89. The side walls are extended at their ends to provide mounting ears 90 for label gripper paws 91. The bottom edges 92 of the side walls are curved and rabbeted, as at 93, to provide seats for the side edges of strip stamps.

Label gripper paws 91 are mounted at each end of the body 79 on shafts 94 which extend through openings in the mounting ears 90. The paws are fixed to the shafts by means of set screws 95, and each shaft is biased so as to urge the paws toward label gripping position by means of coil springs 96, which encircle the shaft ends and are attached to the shafts and to anchor screws 97 in the sides of the body. Each shaft carries an arm 98 with a roller 99 for cooperation with cams 54, 55 and 56 to move the paws from label gripping position. Each gripper paw has a central body 100 with depending legs 101 having inturned toes 102 to engage the end of a stamp edge lying in the rabbet 93.

Mounting column 80 has a base 103, which is of inverted channel shape, and a tubular upper section 104, that is slotted throughout substantially its entire length along diametrically opposed lines, with the plane of the slots 105 being normal to the longitudinal extent of the central chamber 84 of the head body 79. The body is provided with arcuate recesses 106 in its upper face, and the base 103 of the mounting column has projecting lugs 107 which seat in the recesses to position the column with respect to the head base. Bolts 108 attach the mounting column to the base. There is an opening 109 centrally of the upper wall of the channel shaped base 103, and this opening affords communication from the base to the interior chamber 110 of the tubular upper section 104 of the mounting column. The mounting members of the plunger and applicator jaw assembly 81 passes through this opening.

The assembly 81 has its elements mounted on and in a tube 111, which has the applicator jaw carrier 86 at its bottom end. The tube is long enough to be inserted through the opening 109 and extend the full length of the chamber 110 in the tubular upper section of the mounting column 80. The carrier 86 has its at-rest position within the channel of the base section 103. At the top of the tube, a roller carriage 112 is mounted, which carries cam follower rollers 113. The carriage has a central hub 114 which fits upon the top of tube 111 and is secured in place by set screw 115 so that the carriage cannot move relative to the tube 111. The hub 114 has square bosses 116 projecting from its sides to ride in the slots 105 in the tubular upper section of the mounting column 80. This fixes the plane of movement of the carriage and orients the tube 111 with respect to the mounting column. The cam following rollers 113 are mounted on the ends of the bosses 116. The tube and its carriage are limited in their upward movement by means of a cap 117 on top of the tubular upper section 104 of the mounting column 80, and a coil spring 118 is positioned within the tubular upper section 104 between the bottom of the roller carriage 112 and the bottom of the inner chamber 110 of the tubular upper section 104. The spring urges the carriage 112 toward the top of the mounting column into abutment with the cap 117. When the rollers 113 are in contact with the rise 49 of the cam 47, the carriage and tube will be moved downwardly, as will be described in detail.

Figures 8, 9, 10:
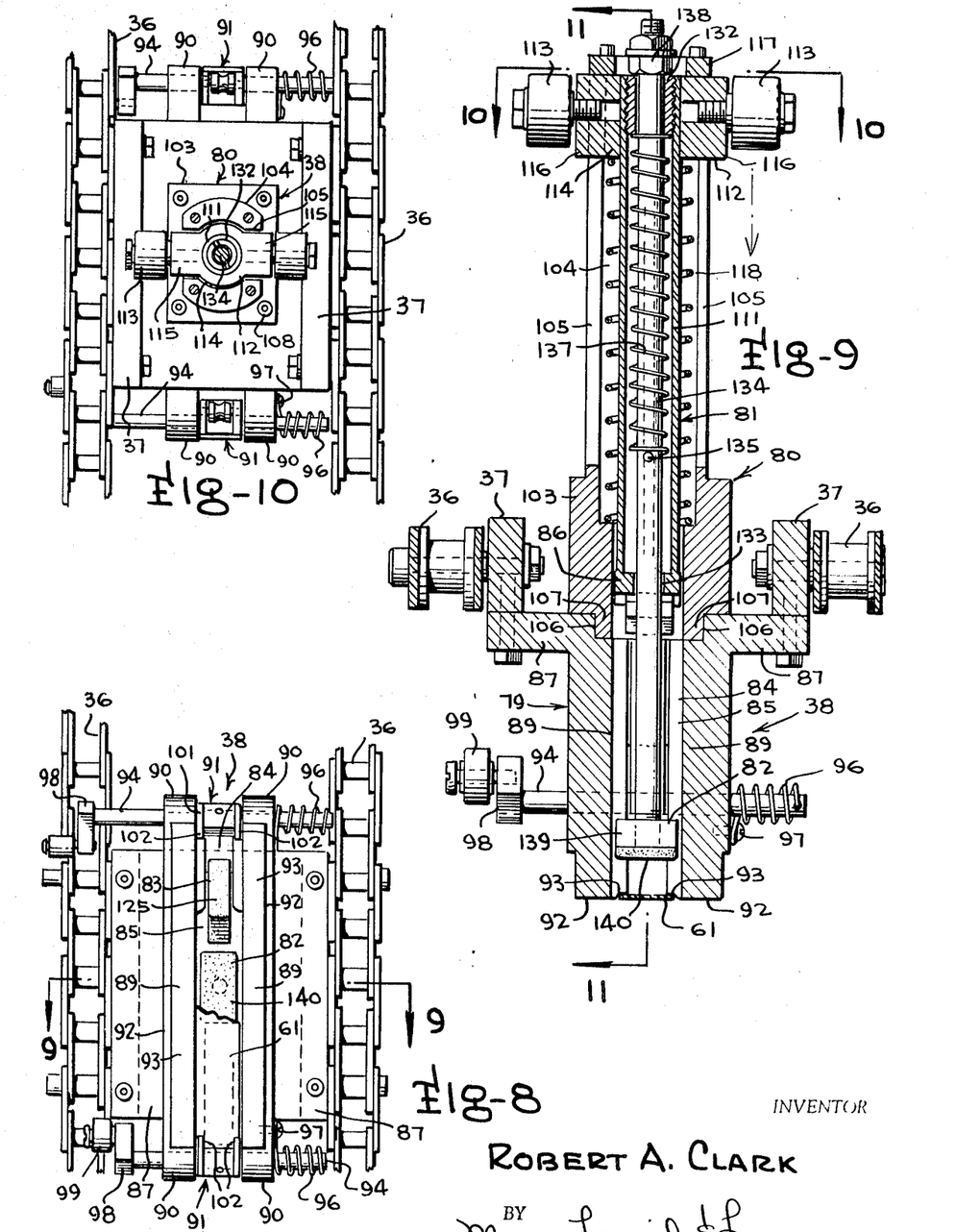
FIG. 8 is a bottom plan view of one of the strip stamp applying heads and portions of the chains on which it is mounted.
FIG. 9 is a vertical section through one of the stamp applying heads, and is taken substantially on the line 9—9 of FIG. 8.
FIG. 10 is a sectional view taken on the line 10—10 of FIG. 9 and shows the major portion of the strip stamp applying head in top plan view.
Figure 11:
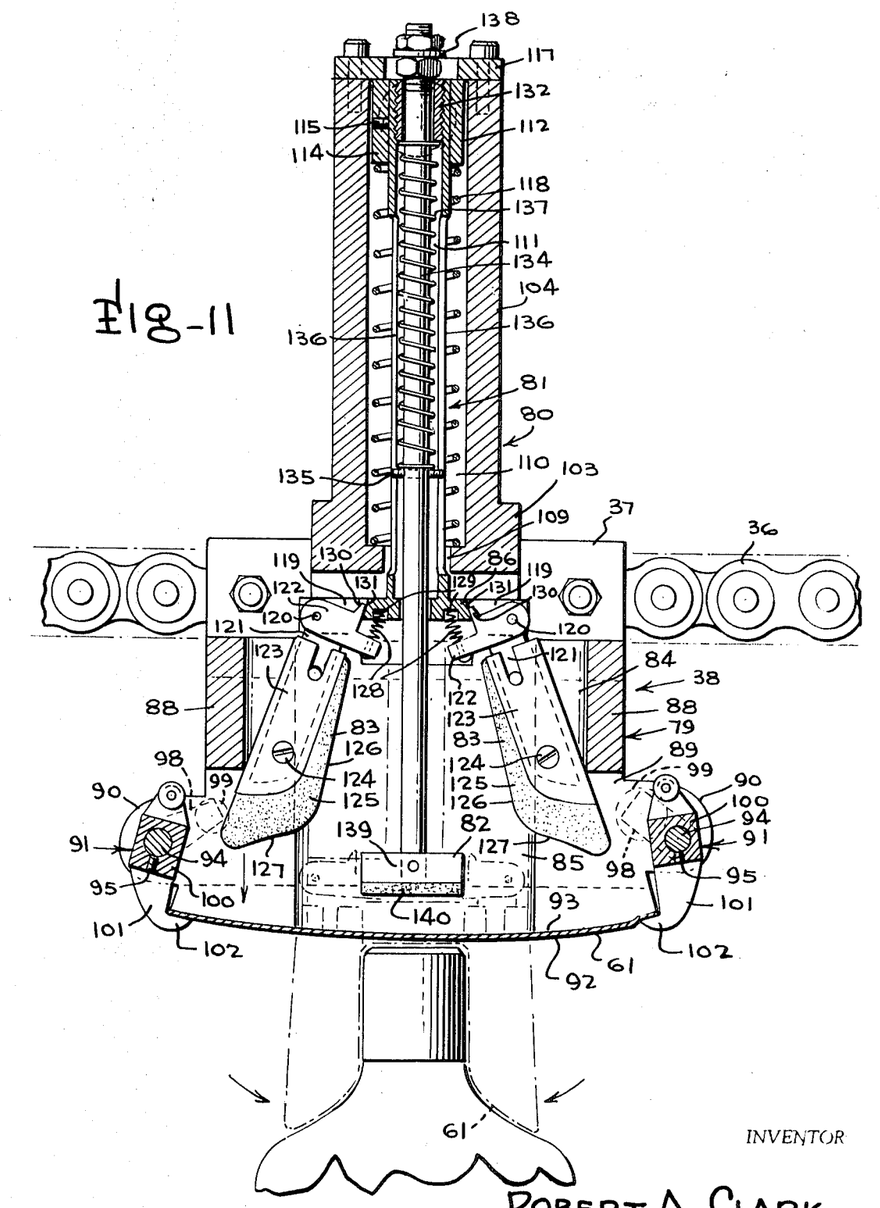
FIG. 11 is a vertical section taken on the line 11—11 of FIG. 9, showing one of the strip applying heads in position for putting a strip stamp on a bottle.
Figure 12:
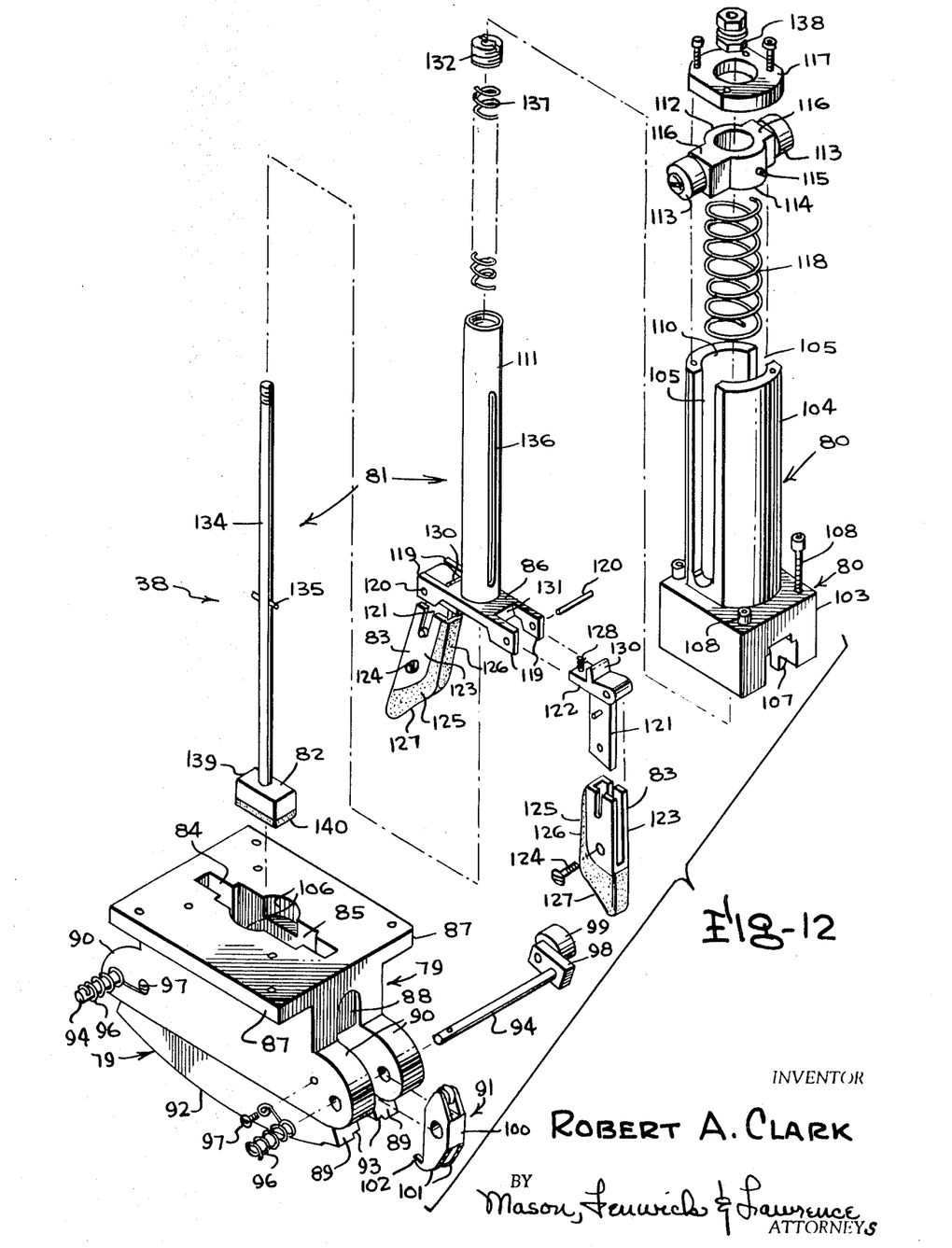
FIG. 12 is an exploded perspective view of one of the strip stamp applying heads.

Applicator jaw carrier 86 is an elongated member extending lengthwise of the channel in the base 103 of the mounting column 80. It terminates at each end in spaced mounting ears 119 which support the applicator jaws 83. The ears have apertures to receive the jaw mounting pivot pins 120. The jaws are composed of bell crank mounting members each having a jaw arm 121 and an actuating arm 122. The actual jaws are removable, and comprise a holder 123, which slips onto the jaw arm 121 and is secured in place by screw 124, and a jaw proper 125 which is of compressible material and has its outer, bottle engaging surface contoured to conform to the shape of a bottle neck and shoulder by including a bottle neck engaging face 126 and a bottle shoulder engaging face 127. The actuating arm 122 supports a coil spring 128 which has its opposite end seated in a recess 129 in the jaw carrier 86, so as to bias the jaws away from one another. The outward movement of the jaws is limited by the abutment of a projection 130 on the arm 122 with a surface 131 of the jaw carrier 86. It will be noted that the actuating arms 122 extend inwardly beyond the neck engaging faces 126 of the jaws. This is important to the operation of the jaws as will be described.

The upper end of the tube 111 is interiorly threaded to receive an exteriorly threaded sleeve 132. This sleeve, together with an opening 133 in the applicator jaw carrier 86, provide mounting guides for a rod 134 that carries the plunger 82. The rod is freely slidable in the sleeve and opening longitudinally of the tube 111. A guide pin 135 through rod 134 moves in slots 136 in tube 111 to maintain the plunger properly oriented with respect to the other elements of the head. A coil spring 137 seats against the guide pin 135 and the underside of sleeve 132 to urge the plunger downwardly. The tension of the spring, and the at-rest position of the plunger 82 with respect to the other elements of the head is adjustably set by means of an adjustment nut 138 threaded on the end of rod 134 and held in bearing contact with the top of sleeve 132 by spring 137. Plunger 82 is rectangular in horizontal section, and consists of a block 139 attached to the end of rod 134 and a stamp pressing pad 140 fixed to the undersurface of the block 139.

It will be understood that when the heads are in their inoperative position, spring 118 will hold the tube 111 in its uppermost position against cap 117, while spring 137 will hold the plunger at its lowermost position relative to the tube 111. In this condition, the jaws will be elevated within the body of the head and spread apart, and the plunger will be up between the side walls of the body, the parts being in the position shown in full lines in FIG. 11.

Figure 6:
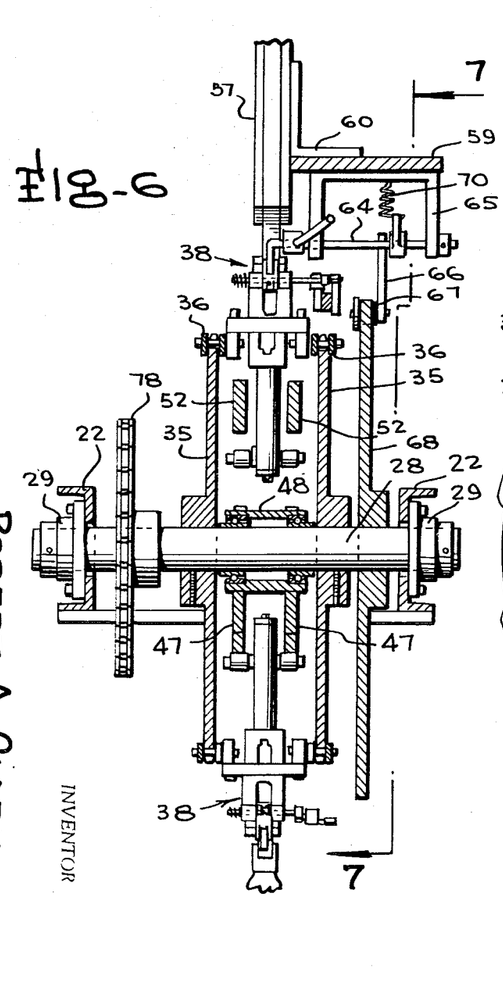
FIG. 6 is a vertical transverse section taken on the line 6—6 of FIG. 2.

As mentioned earlier, the stamp applying mechanism is in effect a part of the labeler machine, for it is mounted over the exit conveyor 3 of the labeling machine. Bottles, which have been properly oriented by conventional means, are advanced by the conveyor 3 through the labeling machine and, in order to maintain the proper orientation, the bottles leaving the labeler are guided between rails 141 elevated above the level of the conveyor chain. If flat bottles are being labeled, guide rails 141 will hold them so that their flat extent is in the line of travel, and the bottles will be unable to move from this orientation in their approach to the stamp affixing mechanism. Although the bottles will be properly oriented insofar as their rotative positions are concerned, the bottles may get out of proper spaced relation during their movement along the conveyor path. In order to insure proper spacing of the bottles and absolute alignment of the bottles with the several heads of the stamp applying mechanism, a spotting chain 142 is employed.

Figure 7:
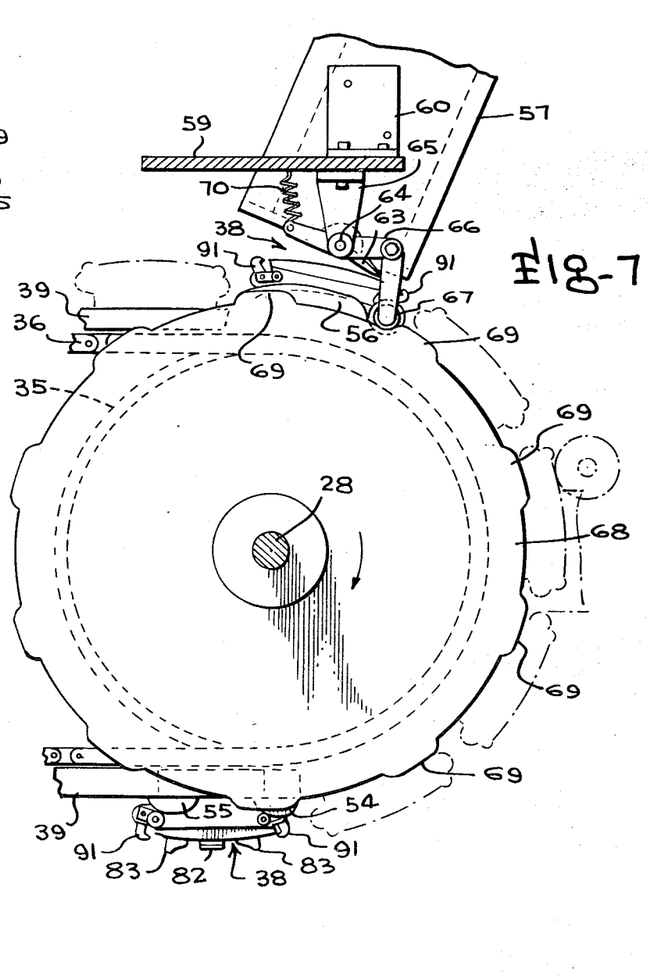
FIG. 7 is a fragmentary vertical longitudinal section taken on the line 7—7 of FIG. 6.

Chain 142 is trained about sprockets 143 mounted on shafts 144 journaled in blocks 145 carried by the machine frame 4. One of the shafts will carry a second sprocket 146 which is driven by a chain 147 from a sprocket 148 carried by the drive shaft 16. Thus, whenever the machine is in operation, the spotting belt will rotate in synchronism with the remainder of the drive. Chain 147 carries pairs of diverging spotting arms 149. The arms are so spaced and arranged that they will lightly engage the sides of a bottle and hold it in precise position as it passes along the stamp applying area of the machine. As the arms travel around the sprockets, they spread apart so that at the entrance to the stamp applying area, bottles moving along the conveyor 3 may freely pass between the arms of a pair. As the arms move onto the straight flight of the chain, they are brought together in bottle engaging position and a bottle which may have moved slightly from its proper position on the conveyor will be brought to an exact location. As the arms travel about the sprocket at the exit end of the applying area, they again spread so that bottles are free to move out from between them.

In operating the machine, a supply of strip stamps is put into the magazine 57 and the proper quantity of adhesive is put into the glue pot 33. Motor 7 is then started to operate the labeler machine 2 to properly apply body labels to the bottles as they travel along conveyor 3 and to rotate the chains 36 carrying the headers 38. At the same time, chain 77 will begin to move to rotate the glue applying roller 71, and chain 142 will rotate to bring the spotter arms 149 into position to engage bottles approaching the strip stamp applying apparatus. As the bottles are oriented before entry into the labeler machine, they will be held in proper position during their travel along conveyor 3. As they arrive adjacent the stamp applying apparatus, spotter arms 149 will engage each bottle and shift it, if necessary, to properly align the center of the bottle cap with the center of a plunger 82 of the header directly above the bottle. As the headers, spotter chain, and feed conveyor 3 are moving at exactly the same speed, the position of the bottle with respect to the overlying header 38 will remain precise throughout the stamp applying area.

As the headers move along the upper flight of chains 36, the gripper paws 91 are in their innermost, or gripping, positions. As the headers approach the magazine 57, the cam 56 will be contacted by the roller 99 of the leading paw and lifted to rock the paw to its open, stamp release, position. As the header moves along, the roller 99 of the trailing gripper paw will strike cam 56 and move the paw to open position. By this time, the leading edge of the header is substantially below the leading edge of the bottom stamp in the magazine 57, and roller 67 will have contacted a rise 69 on the cam 68 to move the stamp feeder 63 up into contact with the leading edge of the bottom stamp in the magazine. As vacuum is applied to the feeder, the leading edge of the stamp will be drawn downwardly as roller 67 moves off of rise 69 and the spring 70 urges the feeder to its lowermost position. The feeder contacts the stamp inwardly of its edge so that when the feeder returns to its lower position it will lay the free leading edge of the stamp on the surface 92 of the header adjacent the leading end and, at that time, the roller 99 of the leading gripper paw 91 will ride off of cam 56 allowing the paw to move to closed, stamp gripping position under the influence of its spring 96. The paw will hold the stamp tightly against the end of the header and, as the header advances, it will draw the remainder of the strip from the magazine and into engagement with the header surface 92. The side edges of the stamp will be lying in the rabbets 93. As the trailing edge of the stamp comes free from the magazine, the roller 99 of the trailer gripping paw 91 will ride off of cam 56 and the paw will move into position to hold the trailing edge of the stamp tightly in its rabbet.

The header with the stamp held tightly across its arcuate surface will then move onto the glue applying position. As the rollers 71 and 72 are in constant rotation, the roller 71 will be continuously supplied with a coating of adhesive over its entire periphery. As the header moves along the adhesive applying position, the stamp is brought into contact with roller 71 and adhesive is applied over the full length of the stamp.

The header continues on its orbital path to bring the stamp to a position where it is centered over the top of a bottle moving along conveyor guide path 3. As the header and bottle begin to move together, maintaining the centered relationship, the respective rollers 99 of the leading and trailing gripper paws contact the cams 54 and 55 to release the stamp ends. At this time, the rollers 113, controlling movement of the plunger 82 and jaws 83, will be the advance incline 50 of cam 47 and the plunger and jaws will be moving downwardly. The plunger will have pressed the center of the stamp against the top of the bottle moving beneath it by the time that the paws 91 release the stamp ends. As the header moves onward, the jaws continue to move down pushing the free ends of the stamp downwardly. The plunger, due to its spring mounting in the tube 111, remains against the stamp on top of the bottle, but its pressure against the stamp will be increased as the spring is compressed. As the jaws continue their downward movement, they will sweep the stamp ends down along the sides of the bottle neck, until such time as the actuating arms 122 of the jaws are brought into contact with the block 139 of the plunger. This contact will stop the downward movement of the actuating arms and cause the jaws to swing about their pivot pins 120 to move inwardly against the bottle neck pressing the stamp tightly against the neck. Due to the compressibility of the jaws 125, the pivotal movement of the jaws can continue after initial contact of the jaws with the bottle neck. This continued inward movement increases the pressure against the stamp, and is accompanied by simultaneous downward movement of the jaws, so that an inward and downward pressure is exerted to stretch the stamp tightly along the sides of the bottle neck and firmly into the curved area between the bottle neck and the bottle shoulders. When the jaws reach their lowermost position the surfaces 126 and 127 of the jaws will be firmly in contact with the stamp along the full length of the bottle neck, around the curvature adjacent the base of the neck and along the shoulders to the full extremities of the stamp. This squeezing pressure is maintained for a period during the travel of the rollers 113 along the rise 49 of cam 47. As the rollers reach the end of the flat rise 49, they will begin to move up the exit incline 51 to allow the tube 111 to be drawn back by its spring 118. As the jaws move upwardly, the pressure upon the actuating arms 122 will be lessened and springs 128 will cause the jaws to begin to swing outwardly. This releases the pressure and the jaws are free to move upwardly to their inoperative positions. After tube 111 has moved upwardly a sufficient distance to bring the stop pin 135 against the bottom of slots 136, the plunger 82 will also be lifted with the jaws to the fully inoperative position. The bottle with its stamp affixed will continue along the conveyor 3, and the header will begin its arcuate movement around sprocket 34 to the upward flight of the chains and a repetition of the cycle just described.

It is to be noted that the travel of the headers in cooperative relation with the bottles is a rather long distance and there is ample time for the application of the label, its stretching and squeezing over the neck and and shoulder areas, and the maintenance of the pressure contact for a sufficient period to insure permanent adherence of the stamp to the bottle. The increase of inward pressure of the jaws accompanied by downward movement assures that all wrinkles will be removed from the stamp so that it will lie absolutely flat against the bottle neck and shoulders and, at the same time, makes certain that the stamp is firmly pressed into the radius at the bottle neck base and tightly pressed onto the bottle shoulders. This is accomplished by reason of the use of compressible jaws and the control of the jaw rotation by contact with the plunger which is already in pressure contact with the center of the stamp.

While in the above one practical embodiment of the invention hase been disclosed, it will be understood that the particular details of construction shown and described are merely by way of illustration and the invention may take other forms within the scope of the appended claims.

What is claimed is:

1. Apparatus for affixing a strip stamp over the top and along the neck and shoulders of a bottle comprising, a frame, a stamp applying head carried by the frame, a bottle supporting means beneath the head, a vertically movable plunger and stamp strip applicator assembly mounted in the head, means to move the assembly vertically, a plunger vertically movable within the assembly and yieldingly biased toward bottle top engaging position, jaws pivotally mounted on jaw support means within the assembly and biased toward open spread position, and means carried by the jaws for contact with the plunger after contact of the plunger with a bottle top during downward movement of the assembly for moving the jaws to closed bottle neck and shoulder engaging position so that further downward movement of the jaw support means provides a sliding clamping movement of said jaws with regard to said stamp strip on the bottle neck to tension and apply the stamp strip to the surface of the bottle neck.

2. Apparatus for affixing a strip stamp over the top and along the neck and shoulders of a bottle as claimed in claim 1 wherein, the jaws have compressible stamp pressing pads, whereby the pads will press stamps against the necks of bottles as the jaws move to closed position and as the assembly continues downward will stretch the stamp ends smoothly along the bottle neck.

3. Apparatus for affixing a strip stamp over the top and along the neck and shoulders of a bottle as claimed in claim 2 wherein, the pads have stamp pressing surfaces conforming to the contour of the bottle neck and shoulders.

4. Apparatus for affixing a strip stamp over the top and along the neck and shoulders of a bottle as claimed in claim 3 wherein, the stamp applying head has a stamp seating surface with respect to which the plunger is centered, gripper paws carried by the head to engage the ends of stamps on the seating surface, and means to move the gripper paws to release stamps on the seating surface.

5. In a bottle labelling machine of the type having means to convey bottles to be labelled through the machine, means to drive the conveying means and means to orient bottles on the conveying means relative to label applying means, the combination with: means adjacent the conveying means beyond the orienting means in the direction of conveying means travel to hold bottles on the conveying means in oriented position, a frame adjacent the conveying means, strip stamp supply means for supplying individual strip stamps to strip stamp supporting and applying means mounted on the frame over the conveying means, and means interconnected with the conveying means drive means to move the strip stamp supporting and applying means into vertical alignment with oriented bottles on the conveying means, the strip stamp applying means including means to sequentially move the strip stamp supporting and applying means downwardly to position strip stamps on the tops of individual oriented bottles on the conveying means, individually press the stamp strip centers against the bottle tops and apply and slidingly press the strip stamp end portions downwardly along opposite sides of the necks of the bottles.

6. The invention of claim 5 additionally including means mounting said strip applying means for movement in an orbital path having a leg above and parallel to the conveying means.

7. Strip stamp affixing apparatus as claimed in claim 6 wherein, there is a strip stamp magazine on the frame adjacent the orbital path of the applying head, and means to transfer strip stamps from the magazine to the applying head.

8. Strip stamp affixing apparatus as claimed in claim 7 wherein there is means on the frame for applying adhesive to stamps on the applying head located intermediate the magazine and said leg in the direction of applying head movement.

9. Strip stamp affixing apparatus as claimed in claim 8 wherein, there is means carried by the frame to spot bottles on the discharging conveyor for precise vertical alignment with the stamp applying head.

10. Strip stamp affixing apparatus as claimed in claim 6 wherein, the means to move the stamp applying head about the orbital path is an endless chain and means to move the chain.

11. Strip stamp affixing apparatus as claimed in claim 10 wherein, the stamp applying head has a vertically movable plunger and applicator jaw assembly, means to move the assembly vertically, a plunger vertically movable within the assembly and yieldingly biased to downward position, jaws pivotally mounted within the assembly and biased toward open spread position, and means carried by the jaws for contact with the plunger upon contact of the plunger with a bottle top to move the jaws to closed bottle neck and shoulder engaging position upon continued downward movement of the assembly.

12. Strip stamp affixing apparatus as claimed in claim 11 wherein, the jaws have compressible stamp pressing pads, whereby the pads will press stamps against the necks of bottles and as the assembly continues downward will stretch the stamp ends smoothly along the bottle necks.

13. Strip stamp affixing apparatus as claimed in claim 12 wherein, the pads have stamp pressing surfaces conforming to the contour of the neck and shoulders of bottles being stamped.

14. Strip stamp affixing apparatus as claimed in claim 13 wherein, the stamp applying head has a stamp seating surface with respect to which the plunger is centered, gripper paws carried by the head adjacent the ends of the stamp seating surface to engage the ends of stamps on the seating surface, and means to move the gripper paws to release stamps on the seating surface.

References Cited
UNITED STATES PATENTS

| | | | |
|---|---|---|---|
| 2,695,721 | 11/1954 | Fairest et al. | 156—572X |
| 2,808,955 | 10/1957 | Sherrington | 156—493X |
| 3,097,983 | 7/1963 | Caulford et al. | 156—493X |
| 2,984,378 | 5/1961 | Gunter | 156—489 |
| 3,322,596 | 5/1967 | Vergobbi et al. | 156—363 |

BENJAMIN A. BORCHELT, Primary Examiner

J. J. DEVITT, Assistant Examiner

U.S. Cl. X.R.

156—489, 493